US006262497B1

(12) United States Patent
Muroi et al.

(10) Patent No.: US 6,262,497 B1

(45) **Date of Patent: *Jul. 17, 2001**

(54) SWITCH INTEGRATED CONTROLLER FOR ENERGIZING AN EXTERNAL ELECTRICAL DEVICE

(75) Inventors: Hiroaki Muroi, Osaka; Takayuki Todokoro; Kazuo Yanagida, both of Gunma, all of (JP)

(73) Assignee: Matsushita Electric Works, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,301

(22) Filed: Sep. 28, 1998

(30) Foreign Application Priority Data

Oct. 30, 1997 (JP) .................................................. 9-299123

(51) Int. Cl.[7] ............................... H02B 1/26; H01H 7/00

(52) U.S. Cl. ........................................... 307/139; 307/116

(58) Field of Search .................................... 307/116, 117, 307/132 EA, 140, 141, 139; 200/38 D

(56) References Cited

U.S. PATENT DOCUMENTS 4,012,607 * 3/1977 Graesslin et al. .................. 200/38 D
4,090,093 * 5/1978 Thompson .......................... 307/117
5,329,082 * 7/1994 Saarem ................................. 200/38
5,479,785 * 1/1996 Novak .................................. 62/155
5,483,212 * 1/1996 Lankuttis ........................... 335/132

FOREIGN PATENT DOCUMENTS 2088989 12/1992 (CA) .

* cited by examiner

*Primary Examiner*—Josie Ballato
*Assistant Examiner*—R. Rios Cuevas
(74) *Attorney, Agent, or Firm*—Arent Fox Kintner Plotkin & Kahn, PLLC

(57) ABSTRACT

A switch integrated controller capable of giving a wide variety of controllers at a reduced cost. The controller has a casing composed of a controller module and a terminal module which are separately formed from each other and detachably connected to each other. The controller module has an entry section for receiving a specific external condition and a signal generating section which generates a trigger signal when the specific condition is met by a predetermined reference. The terminal module includes at least one pair of terminals which are adapted to be connected through wires to the external electrical device and an associated external power source and further includes a relay switch which is connected between the terminals for selectively connecting and disconnecting the electric device to and from the electrical power source in response to the trigger signal. Thus, the terminal module including the relay switch can be made common to different kinds of the controller modules and can be assembled with the controller module into a single unit only at an expense of simple mechanical connection between enclosures of the respective modules and electrical connection between the switch relays and the signal generating section. With this result, a wide variety of controller units of different functions can be fabricated at a reduced cost.

13 Claims, 10 Drawing Sheets

SWITCH INTEGRATED CONTROLLER FOR ENERGIZING AN EXTERNAL ELECTRICAL DEVICE

BACKGROUND OF THE INVENTION

1. Field of the Invention

The present invention is directed to a switch integrated controller for energizing an external electrical device in a controlled manner.

2. Description of the Prior Art

U.S. Pat. No. 5,329,082 discloses a conventional timer controller for controlling an electrical device. The controller includes a mounting plate which is accommodated in a housing to mount thereon the timer with a rotary switch, in addition to an array of terminals which are adapted to be connected by way of wires to a power circuit including the electric device and a power source thereof. The switch is inserted in the power circuit to selectively energize and deenergize the electric device in response to a particular position of a time dial of the timer. In the meanwhile, there has been an increasing demand of providing a wide variety of sophisticated controllers which are designed specifically to have accessory functions in conformity with individual needs at various installation sites. Such controllers are different in their specific functions or components utilized, for example, different timing control schemes, different kinds of timers of either mechanical or electronic type, and so on. However, when the switch is provided in the form of a relay switch which is activated by a trigger signal from the timer, the relay switch as well as the terminals could be common components to these different controllers. This is also true when the controller is provided with a temperature control section other than the timer, which, for example, controls the electric device depending upon a temperature signal from an external temperature sensor. Therefore, it is highly desired to provide different kinds of controllers while using the common terminals and the relay switch in order to reduce a cost of manufacturing the individual controllers, and enable the use of molds which is of simpler configurations than otherwise for production of the controllers.

SUMMARY OF THE INVENTION

The present invention has been accomplished in view of the above and has a primary object of providing a switch integrated controller which is capable of giving a wide variety of controllers at a reduced cost. The switch integrated controller of the present invention has a casing composed of a controller module and a terminal module which are separately formed from each other and detachably connected to each other. The controller module has an entry section for receiving a specific external condition and a signal generating section which generates a trigger signal when the specific condition is met by a predetermined reference. The terminal module includes at least one pair of terminals which are adapted to be connected through wires to the external electrical device and an associated external power source and further includes a relay switch which is connected between the terminals for selectively connecting and disconnecting the electric device to and from the electrical power source in response to the trigger signal. Thus, the terminal module including the relay switch can be made common to different kinds of the controller modules and can be assembled with the controller module into a single unit only at an expense of simple mechanical connection between enclosures of the respective modules and electrical connection between the switch relays and the signal generating section and the like electrical connection as necessary. With this result, a wide variety of controller units of different functions can be fabricated at a reduced cost, with additional effects of simplifying configurations of molds for production of enclosures of the overall controller unit than when an enclosure of terminal module is formed as an integral part of an enclosure of the controller module, and of facilitating an inventory management of the parts utilized in the controller unit.

The terminal module has a terminal block which carries an array of terminals, a circuit board mounting thereon the relay switch, and electronic components forming a driver for activating the relay switch in response to the trigger signal. The relay switch is provided with input pins for soldering electrical connection with the circuit board to receive an activating signal from the driver and with output pins for direct soldering electrical connection with the terminals. Generally, the output pins of the relay switch are of reduced cross section and likely to produce a large amount of heat as a large current flows through the electric device. Because of the direct soldering connection of the output pins of the relay switch to the terminals, the heat given off at the output pin can be released through the terminals of generally large cross section for easy heat radiation from the relay switch.

The terminal block includes a horizontally extending platform for supporting thereon the circuit board. The platform is formed with an opening or openings to allow the soldering connection between the relay switch and the circuit board as well as between the relay switch and the terminals, respectively from the bottom of the terminal module. Thus, the relay switch can be easily connected by soldering to the terminal block.

One of the controller module and the terminal module is provided with a hook which detachably engages with a catch formed in the other of the modules for easy mechanical assembly.

For easy electrical interconnection between the two modules, one of the terminal module and the controller module is equipped with a plug which is detachable to a socket provided on the other module.

The terminal is provided with a terminal screw extending through a front end portion of the terminal. The relay switch is fitted over rear end portions of the terminals and the circuit board with the output pins and the input pins projecting respectively through the rear end portions of the terminals and the circuit board. The terminal may be bent to make a step between the front end portion and the rear end portion which is in level with the circuit board for spatially arranging the relay switch and the electronic parts in an overlapping relation with the length of the terminal screw. This contributes to reduce a height of the terminal module including the relay switch and the associated electric components.

The casing or the controller unit is accommodated in a housing in a spaced relation from an inner bottom of the housing. The housing is formed on its inner bottom with studs which support the inner casing at portions immediately below to the terminal screws in order to reinforce the terminal block against a force applied when fastening the terminal screws for preventing otherwise warp or deformation of the terminal block.

The housing is provided in its wall with holes for passing therethrough the wires connected leading to terminals. The housing is also provided on its bottom with baffles which project towards the casing adjacent to the terminals for preventing the wires from entering a clearance between the inner casing and the inner bottom of the housing.

The controller module may be a timer having the entry section for setting a desired time as the specific external condition and having the signal generating section which generates the trigger signal when the desired time is coincident with the predetermined reference.

Further, the controller module may be arranged to make a temperature control based upon a temperature signal received at the entry section as the specific external condition from an external temperature sensor, the signal generating section generating the trigger signal when the temperature signal exceeds the predetermined reference.

These and still other objects and advantageous features of the present invention will become more apparent from the following description of the preferred embodiments when taken in conjunction with the attached drawings.

DETAILED DESCRIPTION OF THE INVENTION

Figure 1:
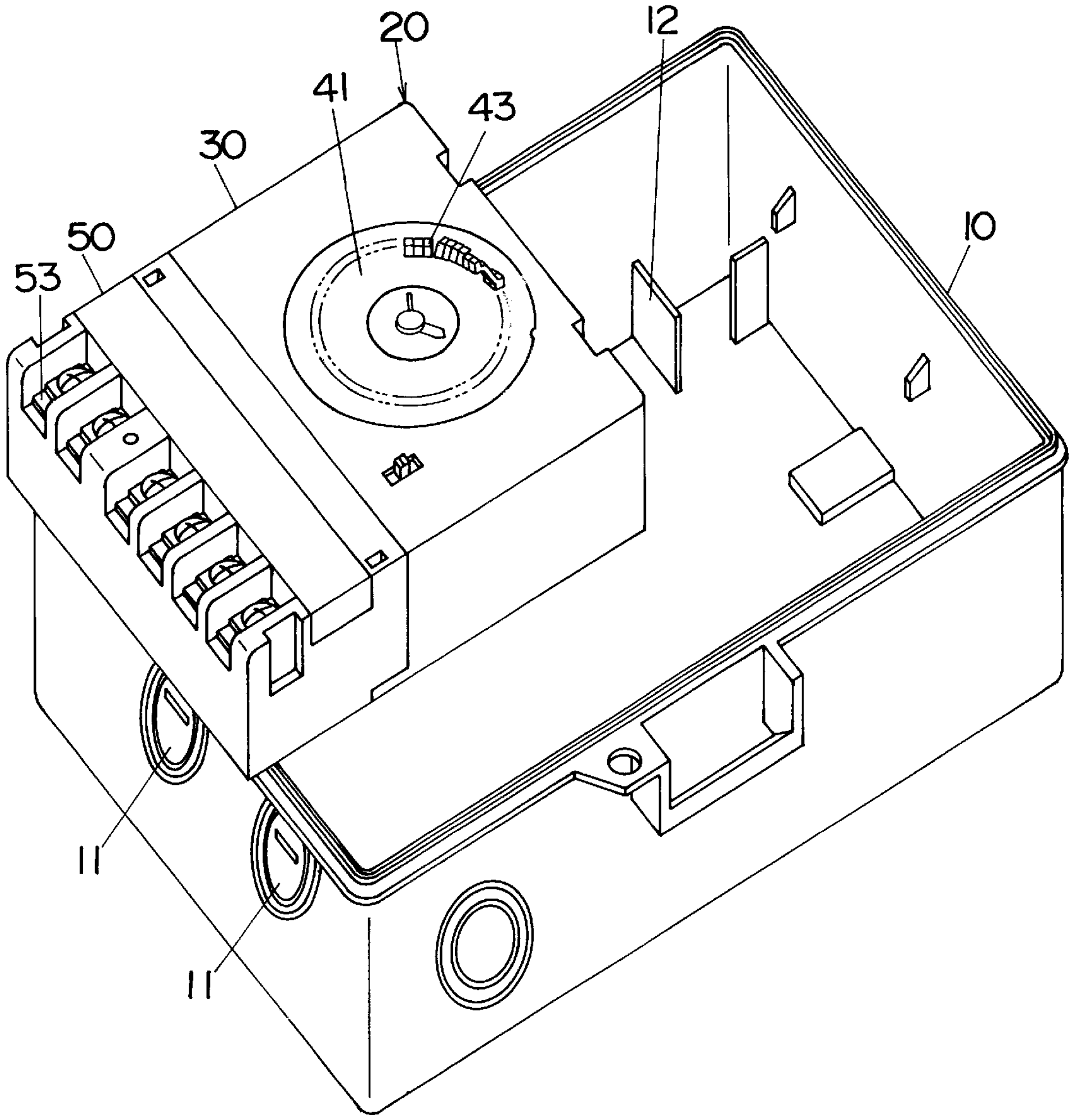
FIG. 1 is a perspective view of a switch integrated controller in accordance with a preferred embodiment of the present invention.

Referring now to FIG. 1, there is shown a switch integrated controller in accordance with a preferred embodiment of the present invention. The controller has a casing 20 in which a timer is mounted for controlling to energize and deenergize an external electric device or devices on a time basis. The casing 20 is accommodated within a housing 10 with a lid (not shown) for sealing the casing within the housing 10. In most cases, the housing 10 is installed on a wall of a building or pole and is electrically connected to a power circuit including the external electric device and a power source thereof. For this purpose, the housing 10 is provided in its side walls with knockouts 11 which form openings for passing therethrough electrical wires into the interior of the housing 10.

Figure 2:
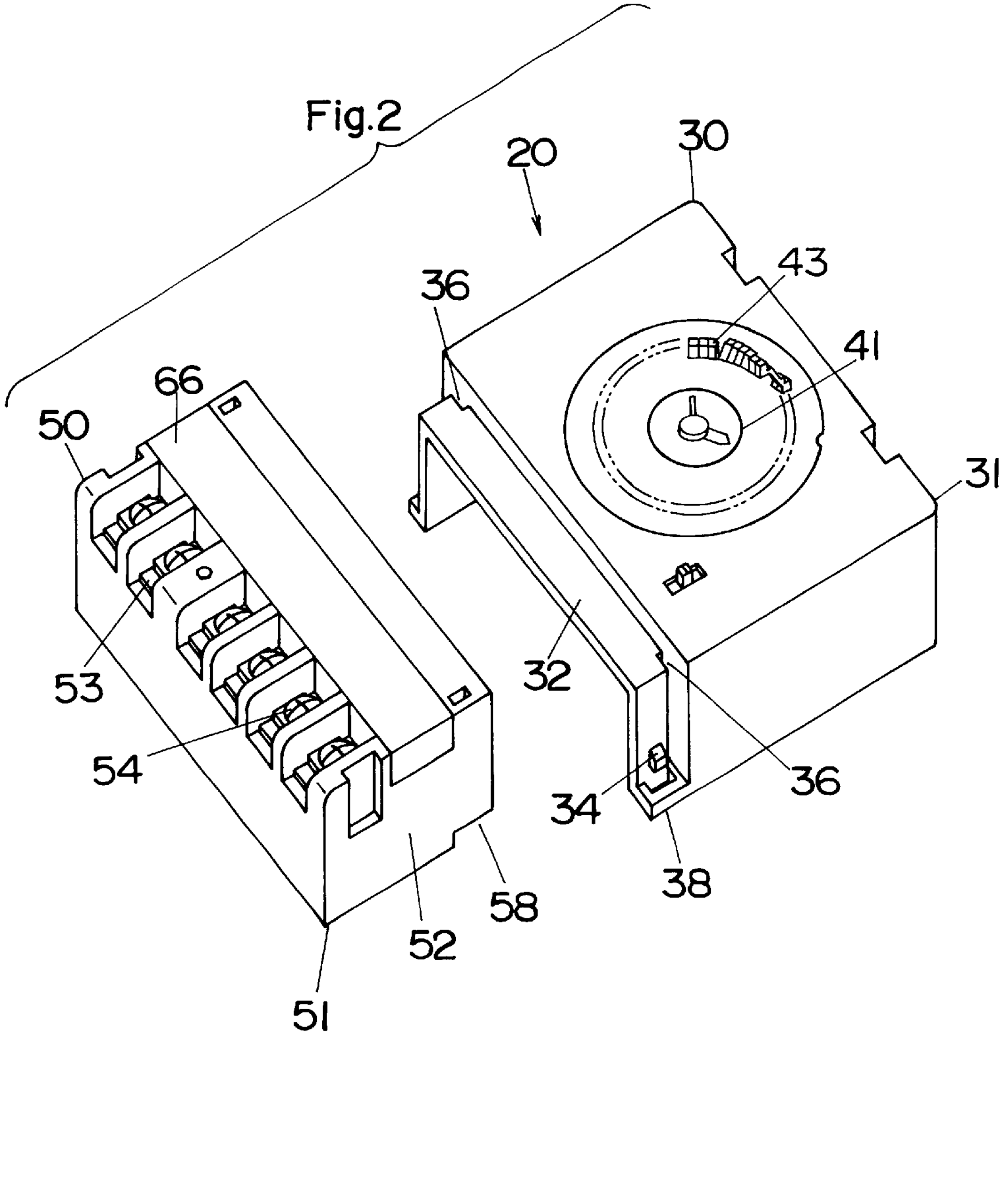
FIG. 2 is an exploded perspective view of a controller module and an associated terminal module utilized in the above controller.

As best shown in FIG. 2, the casing 20 is composed of a control module 30 and a terminal module 50 which are detachably connected to each other to give a single unit. The terminal module 30 is physically connected to the controller module 50 in an end-to-end relation to make a top surface of the terminal module in flush with a top surface of the control module. Projecting from a front face of the controller module 30 is a flange 32 which fits into a rear opening of the terminal module 50. The flange 32 has a pair of opposed legs each provided with a hook 34 for detachable engagement with corresponding catch recess 57 formed in each side wall 52 of the terminal module 50. Formed along the legs of the flange 32 are a pair of opposed vertical guide groove 36 for slidably receiving corresponding vertical ribs 56 on the inner side walls of the terminal module 50. A pair of tabs 38 project outwardly from the lower end of the legs of the flange 32 and is received in corresponding notches 58 in the side walls of the terminal module 50.

Figure 4:
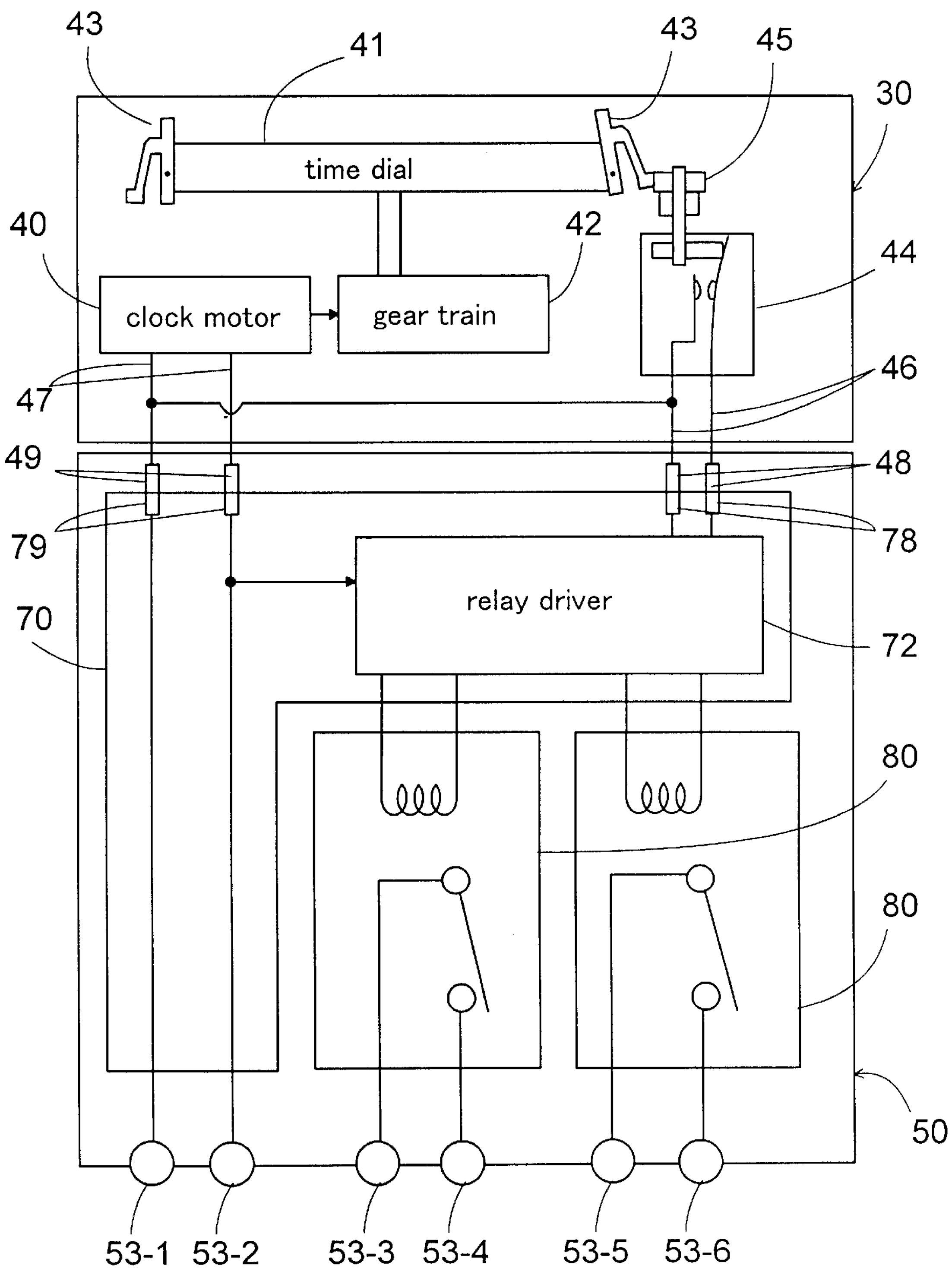
FIG. 4 is a schematic view illustrating an internal configuration of a combination of the controller module and the terminal module.
Figure 5:
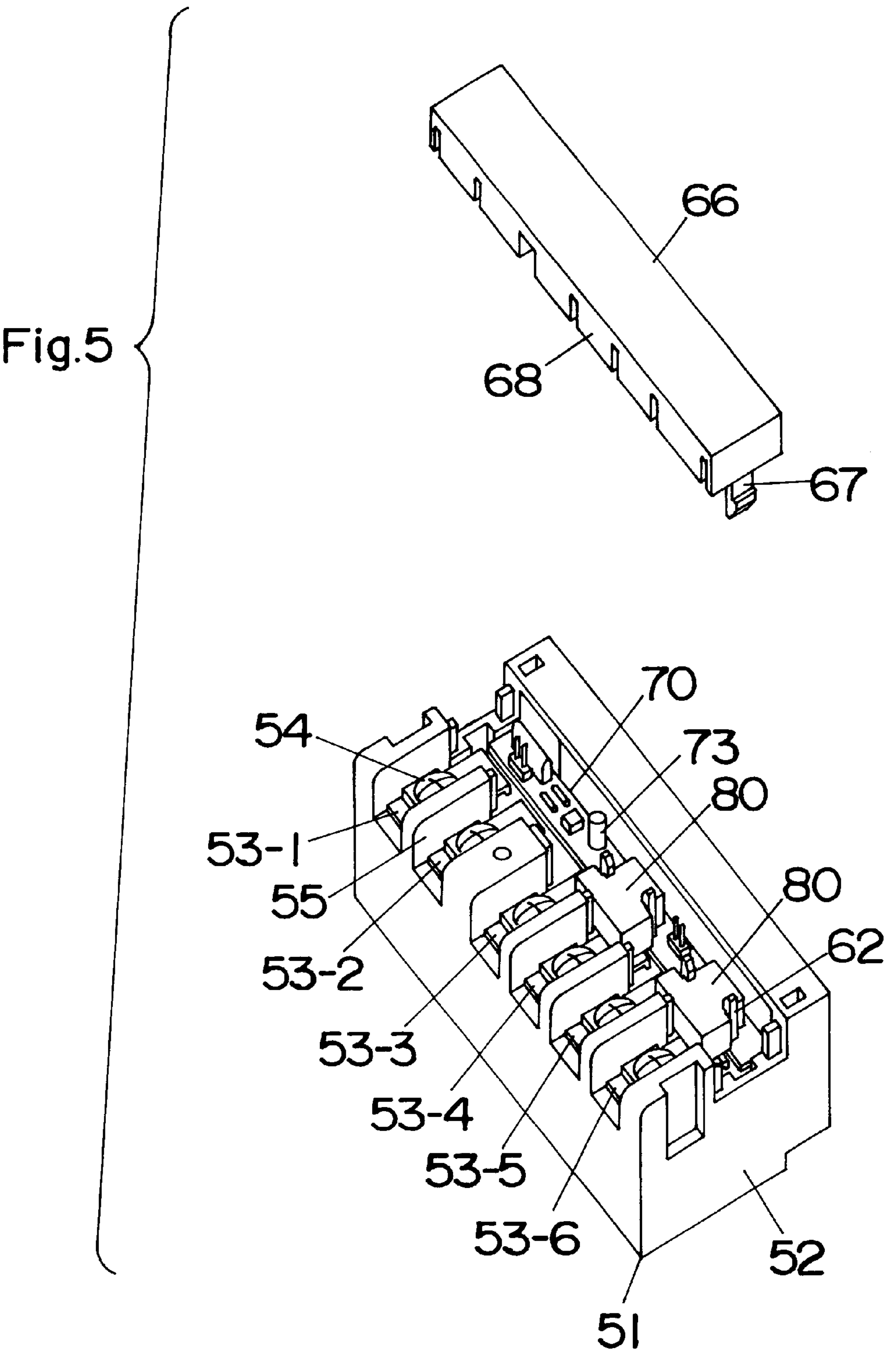
FIGS. 5 and 6 are exploded perspective views of the terminal module.
Figure 6:
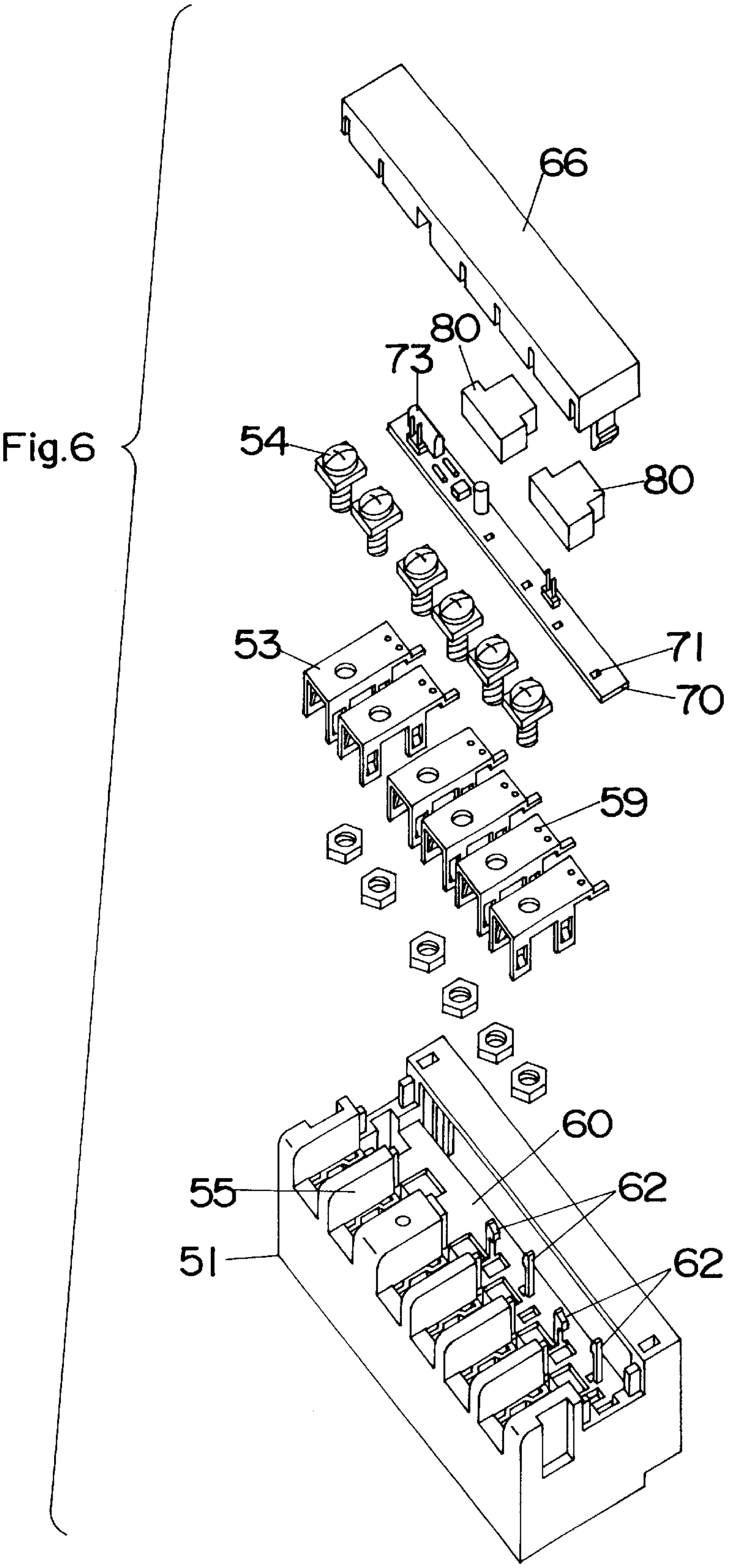

The controller module 30 has a rectangular bottom-open box 31 mounting the timer, while the terminal module 50 includes a terminal block 51 of dielectric material carrying an array of terminals 53 as well as relay switches 80. The timer is of a conventional configuration, for example, as disclosed in Japanese Patent Publication No. 7-85379 and, as schematically shown in FIG. 4, has a synchronous clock motor 40 which is energized to drive a time dial 41 through a gear train 42 to rotate the dial one complete revolution per day. The time dial 41 is mounted within a recess in the top wall of the controller module box 31 and is manually rotatable in a clockwise direction for setting a time of day. Arranged around the time dial 41 are a number of set pins 43 which are pivotally supported to the periphery of the time dial to move between an upstanding ON-position and an inwardly inclined OFF-position. The set pins 43 corresponds to time markings on a 24 hour clock to set desired time periods at intervals of 15 minutes. A normally closed switch 44 is mounted interiorly of the box 31 and is caused to open by a cam wheel 45 which is in turn actuated by contact with the set pin 43 during the rotation of the time dial 30. When the set pin 43 is in the ON-position, the cam wheel 45 is kept intact from the set pins 43 to thereby keep the contacts closed. When, on the other hand, the set pin 43 is moved to the inward OFF-position, the set pin 43 encounters the cam wheel 45 during the rotation of the time dial 30, which in turn causes the switch 44 to open the contacts. Thus, so long as the contacts are closed, the switch 44 provides a trigger signal for energizing the external device in accordance with the desired time schedule determined by the set pins 36. In this respect, the switch 44 defines a signal generating section which generates the trigger signal when a desired time period selected by the user as a specific external condition being met by an internal reference, say, a time of the day counted by the timer. The switch 44 includes a pair of conductor leads 45 for connection with the relay switches 80 of the terminal module 50. Also, a pair of leads 47 extend from the motor 40 of the timer for connection with a pair of terminals 53-1 and 53-2 of the terminal block 50 to be energized by an external power source connected across the terminals.

As shown in FIGS. 5 to 8, the terminal module 50 is composed of the terminal block 51 and a top cover 66 which defines a top surface of the module. The terminal block 51 carries three pairs of the terminals, one pair 53-1 and 53-2 for connection with the power source to energize the motor 40, the remaining two pairs of terminals 53-3, 53-4 and 53-5, 53-6 each for connection with the external electric device and the associated power sources thereof. The terminals 53 each provided with a terminal screw 54 are arranged in a row in the front end of the terminal block 51 and separated by partitions 55. The terminal block 51 is molded to have an integral platform 60 which extends rearwards and horizontally for supporting thereon a circuit board 70 mounting electronic components 73 as well as rear portions of the switch relays 80. The electronic components constitutes a driver 72 which actuates the relay switches 80 upon receiving the trigger signal from the switch 44 of the controller module 30. The circuit board 70 gives conductor paths between the motor 40 and the corresponding pair of the terminals. As shown in FIG. 4, the relay driver 72 is connected to derive its power form the line leading to the motor 40 to activate an electromagnet of each relay switch 80 for contact closing and opening of the relay switch, and thereby closing and opening the power circuit of the electric device and the power source thereof each connected to the pair of terminals 533, 53-4 and 53-5, 53-6. The relay switch 80 has a pair of input pins 81 for connection of the electromagnet with the driver 72 and a pair of output pins 82 for connection of the contacts to the corresponding terminals 53.

Figure 7:
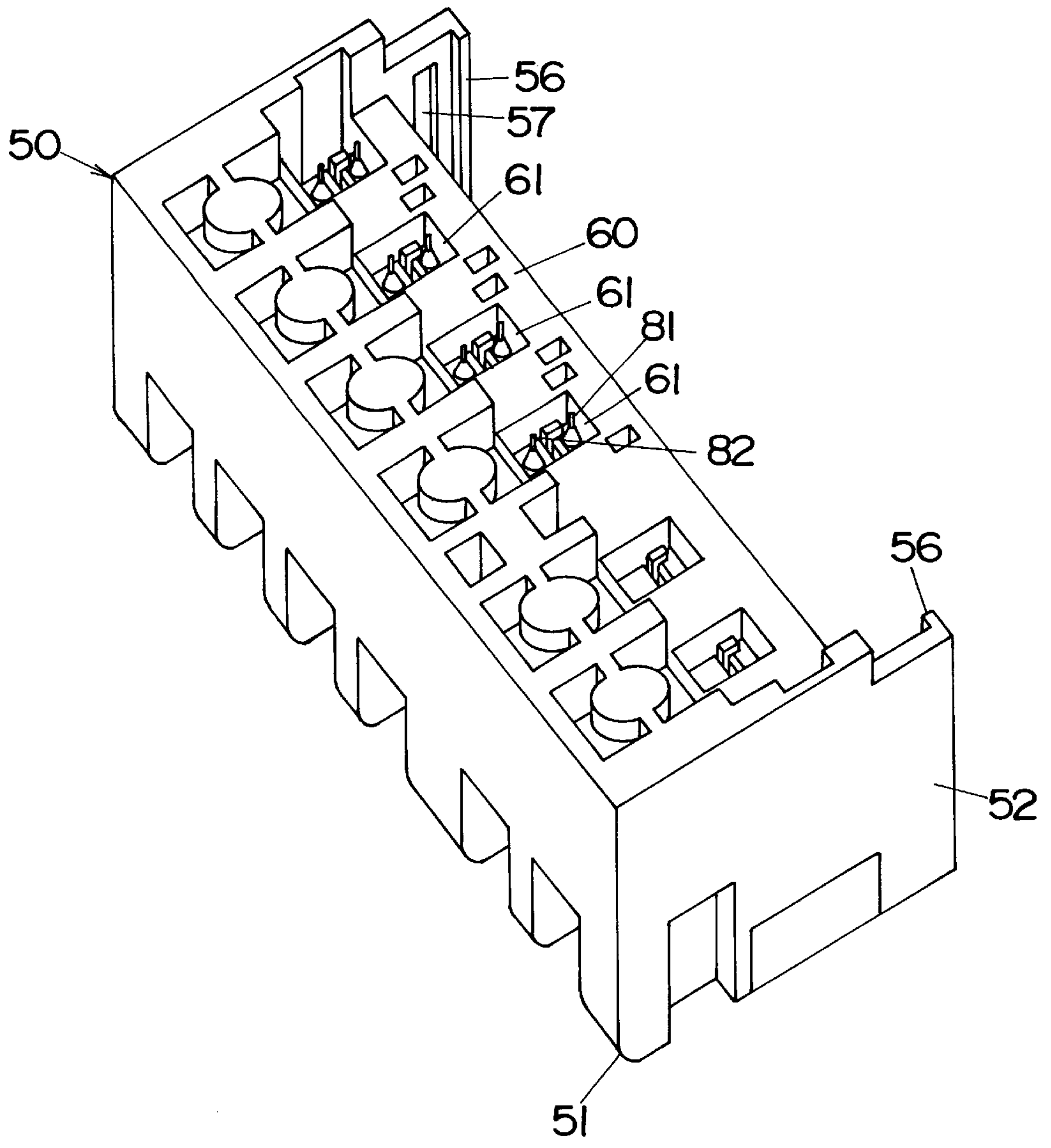
FIG. 7 is a perspective view illustrating a bottom of the terminal module.
Figure 8:
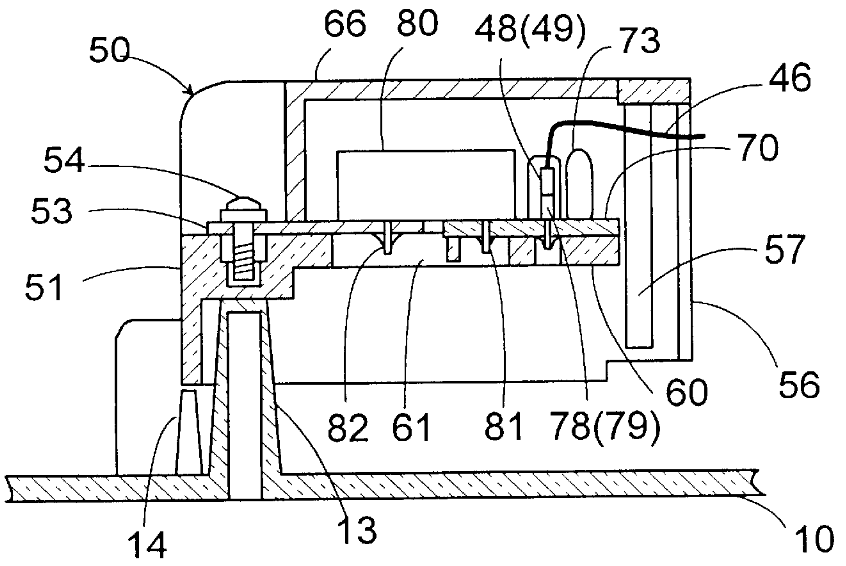
FIG. 8 is a sectional view of the terminal module.
Figure 9:
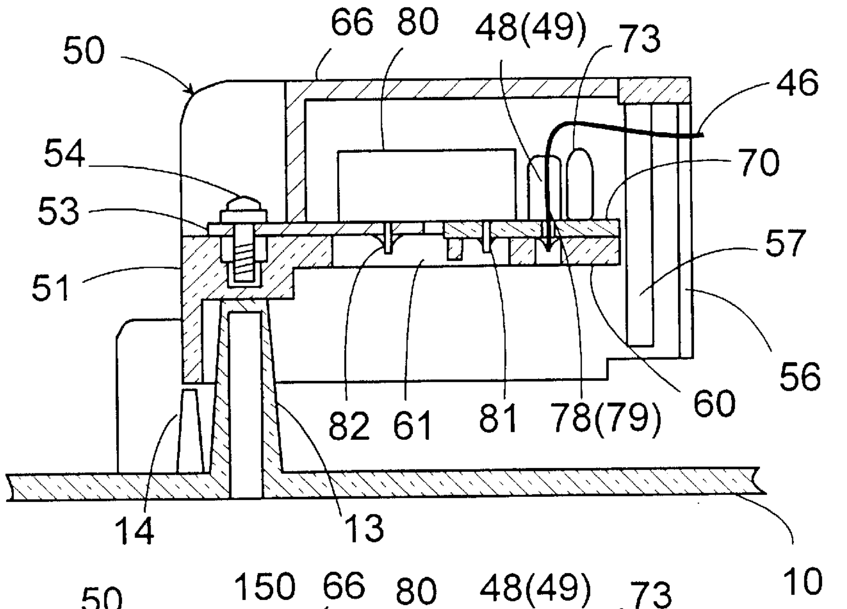
FIG. 9 is a sectional view similar to FIG. 8 but of a modified terminal module.

As best shown in FIG. 8, the terminals 53-3, 53-4 and 53-5, 53-6 have their respective rear end portions extending rearwards in an aligned relation with the circuit board 70 but in a spaced relation thereto. The relay switch 80 is mounted across the rear end portion of the terminal 53 and the circuit board 70 with the output pins 82 projecting directly through holes 59 in the adjacent terminals and with the input pins 81 projecting through holes 71 of the circuit board 70. As best shown in FIG. 7, the platform 60 is formed with openings 61 through which the connections of the input pins 81 and the output pins 82 are exposed so that these pins can be soldered to the terminals 53 and the circuit board 70 from the bottom of the terminal module 50. The platform 60 is also provided with sets of retainer arms 62 for retaining the relay switches 80 in position, which facilitates the soldering connection of the relay switches 80. Since the output pins 82 of the relay switch 80 are directly soldered to the terminals 53-3, 53-4 and 53-5, 53-6, resistive heat developed in the output pins 82 can be conducted to the terminals for successfully dissipating the heat. The resistive heat is likely to develop when a large current of, say 30 A, flows through the output pins 82 which is of generally small cross-section and therefore should be radiated quickly for protection of the relay switches. In this sense, the terminal may be provided additionally with radiator fins for expediting the heat radiation. Also formed on the circuit board 70 is sockets 78 (79) for detachable connection respectively with plugs 48 (49) at the ends of the conductor leads 46 and 47 respectively from the switch 44 and the motor 40. Thus, the switch 44 is electrically connected to the driver 72 for transmitting the trigger signal thereto, and the motor 40 is electrically connected to the associated terminals 53-1 and 53-2 though conductor patterns on the circuit board 70. When it is required to connect the conductor leads 46 and 47 directly by soldering to the circuit board without using the socket and plug combination, as shown in FIG. 9, the soldering from the bottom of the terminal block 51 can be made through additional openings 63 form in the rear end of the platform 60. After mounting the relay switches 80 on the circuit board 70 and the terminals 53, the top cover 66 is attached to the terminal block 51 to cover the relay switches and the circuit board. The top cover 66 includes a pair of resilient legs 67 for connection with corresponding recesses in the side walls of the terminal block and also includes a skirt 67 which closes rear ends of individual spaces formed between the partitions 55.

Figure 3:
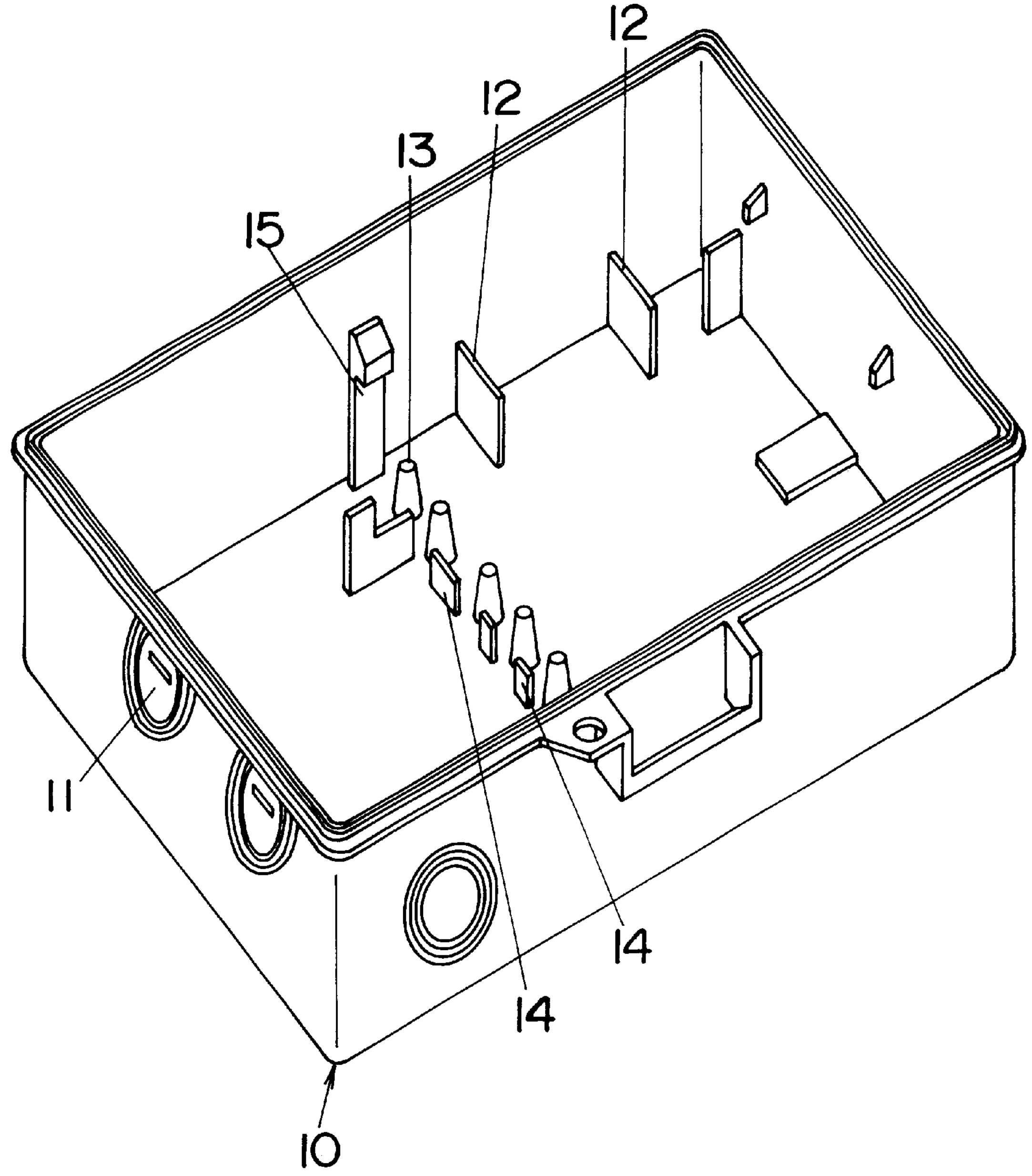
FIG. 3 is a perspective view of a housing utilized in the above controller.

As shown in FIG. 3, the housing 10 is provided with a plurality of stands 12 and 13 supporting thereon the terminal module 50 as well as the controller module 30 in a spaced relation from the inner bottom of the housing 10 for keeping the electrical components out of contact with rainwater possibly invading and staying in the bottom of the housing 10. The stands include studs 13 projecting to abut against the terminal block 51 at portions corresponding to the terminal screws 54 to bear a force applied when fastening the terminal screw 54 for reinforcing the terminal block against deformation or breakage of the terminal block. Also formed on the bottom of the housing 10 are baffles 14 which project toward the front bottom of the terminal block 51 in order to block undesired entry of the wires into the space between the terminal module 50 and the inner bottom of the housing 10, thus avoiding inconvenience of misleading the wires introduced into the housing for connection with terminals. A pair of latch arms 15 extend from the bottom of the housing 10 for retaining the inner casing 20, i.e., the assembled combination of the controller module 30 and the terminal module 50.

Figure 10:
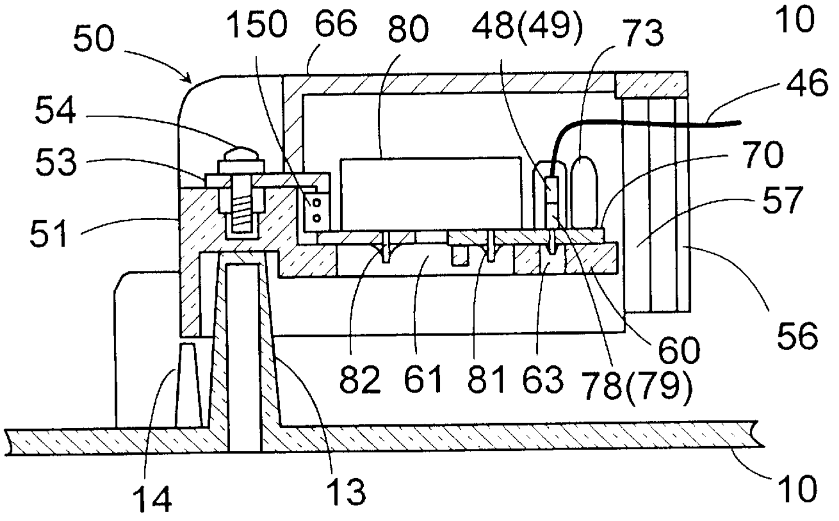
FIG. 10 is a sectional view similar to FIG. 8 but of another modified terminal module.

FIG. 10 shows a modification of the terminal block in which each terminal 53 is bent to have a step between the front end portion provided with the terminal screw 54 and a rear end portion receiving the front end of the relay switch 80. The rear end portion of the terminal is horizontally aligned with the circuit board 70 so that major portions of the relay switch 80 and the components on the circuit board 70 are arranged within the height of terminal screw 54, which contributes to reduce the overall height of the terminal module 50. In this modification, the terminal 53 is provided additionally with radiator fins 150 for expediting radiation of heat transmitted to the terminal from the output pin of the relay switch, as discussed hereinbefore.

The controller module 30 can be modified in accordance with particular demands by the user. For example, the timer may be designed to operate in a cycle of one week. Also, the timer may additionally include a compensation circuit against power failure, a circuit breaker, or any other circuit of making accessory functions as desired. Further, instead of the above mechanical timer, the controller module 30 may be designed to include an electronic timer with an LED digital display, set buttons for adjusting the present time and desired time duration of energizing or deenergizing the external electrical device. The electronic timer includes the switch which generates the trigger signal as well as an electronic clock which is analogous to the motor of the mechanical timer and energized by electricity fed through the terminals 53-1 and 53-2 of the terminal module 50. As such, it is desired to give different functions to the controller module. Since the controller module 30 of the present invention is detachably connected to the terminal block 50 which can be common to the controller units, the controller unit of different type can be realized simply by assembling the controller module having a specific function with the common terminal module 50.

Figure 11:
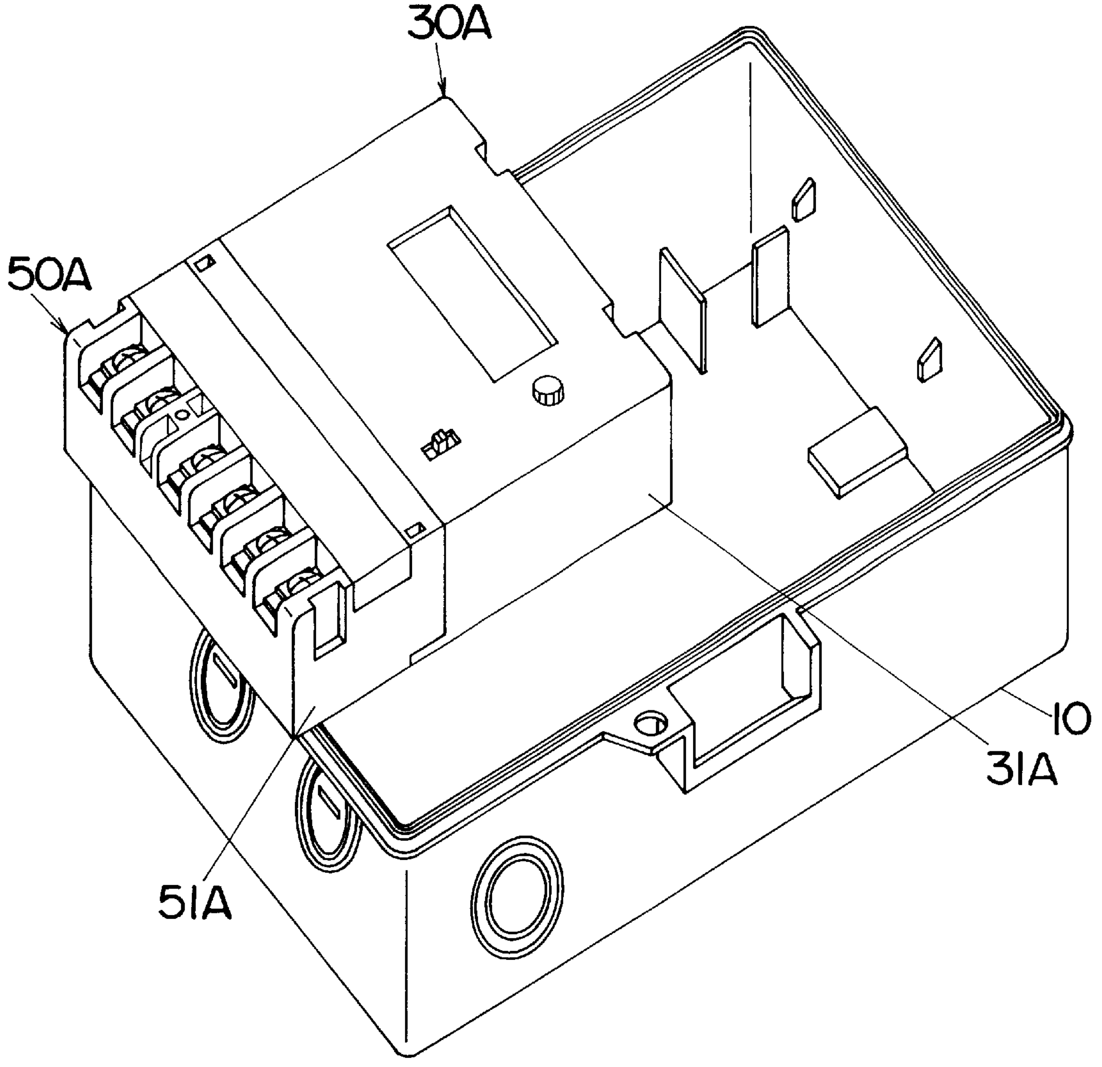
FIG. 11 is a perspective view of another switch integrated controller in accordance with a second embodiment of the present invention.
Figure 12:
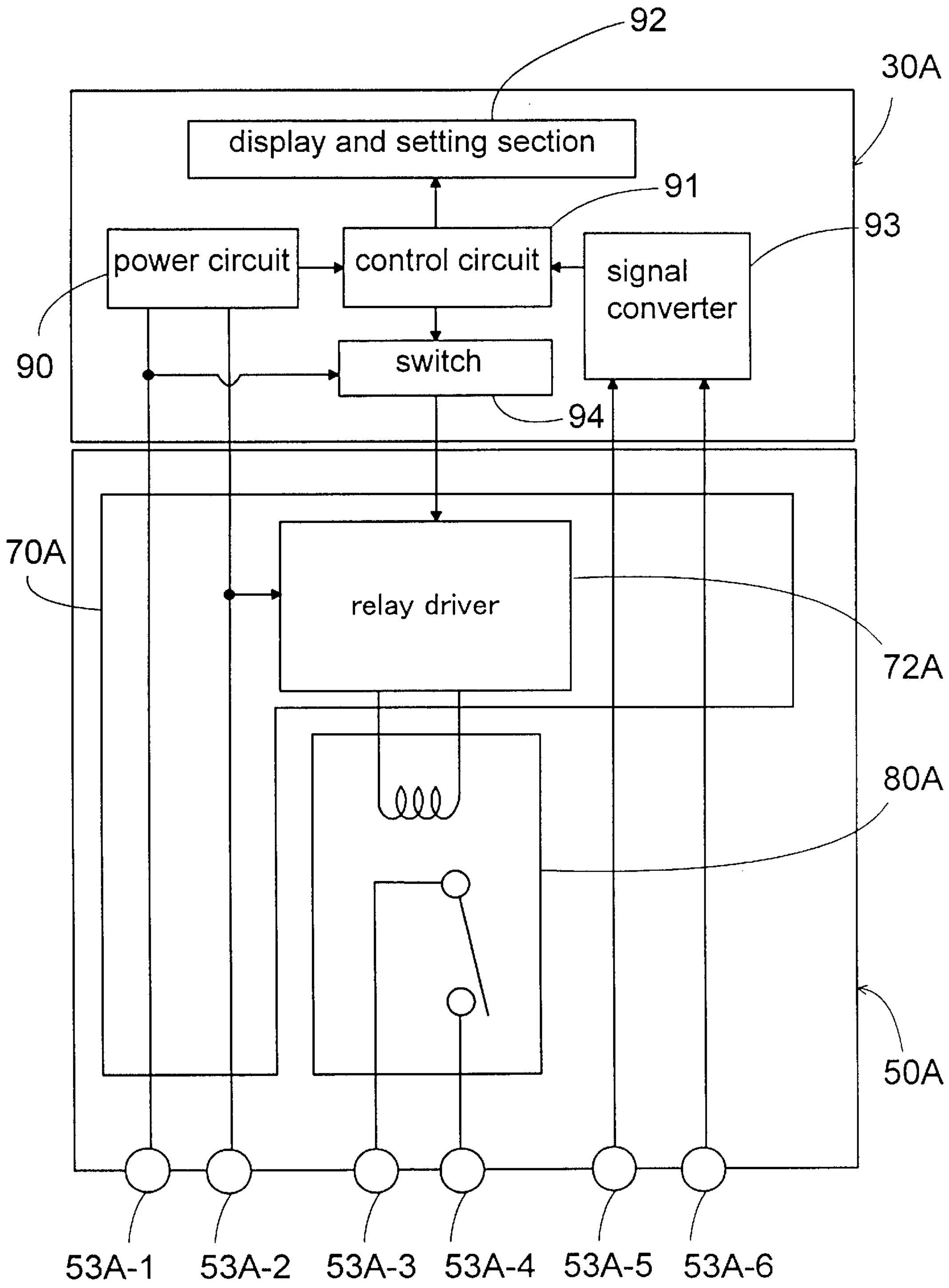
FIG. 12 is a schematic view illustrating an internal configuration of a combination of the controller module and the terminal module of FIG. 11.

FIGS. 11 to 12 show another embodiment of the present invention. A controller module 30A in this embodiment is designed for control of the electric device in response to a temperature signal from an external temperature sensor (not shown). The controller module 30A has a like box 31A incorporating therein electronic components which form a power circuit 90, a control circuit 91 energized by the power circuit, a display-and-setting section 92, a signal converter 93, and a switch 94. The power circuit 90 is connected to an external power source to drive the control circuit 91 for controlling the display-and-setting section 92 which is composed of a display for a temperature being monitored and a reference temperature, and buttons for manually setting the reference temperature. The signal converter 93 is connected to receive a temperature signal from the temperature sensor to give a digital data indicative of the temperature being monitored to the control circuit 91 for comparison with the reference temperature. When the monitored temperature exceeds the reference temperature, the control circuit 91 causes the switch 94 to give the trigger signal.

In the same manner as in the previous embodiment, the controller module 30A is detachably connected to a complimentary terminal module 50A which has three pairs of terminals. One pair of the terminals 53A-1, 53A-2 are provided for connection to the external power source for supplying electricity to the power circuit 90, another pair of terminals 53A-3, 53A-3 for connection with the external electric device, and the remaining one pair for connection to the temperature sensor. Also, as in the previous embodiment, the terminal module 50A carries a relay switch 80A and a circuit board 70A mounting electronic components forming a driver 72A of the relay switch 80A. Further, the circuit board 70A gives conductor paths between the power circuit 90 and the corresponding pair of the terminals and between the signal converter 93 and the corresponding pair of the terminals. The relay driver 72A is connected to derive its power form the line leading to the power circuit 90 to activate an electromagnet of the relay switch 80A for contact closing and opening of the relay switch in response to the trigger signal, and thereby closing and opening the power circuit of the electric device and the power source thereof connected to the pair of terminals 53A-3 and 53A-4.

The terminal module 50A includes a terminal block 51A which is of substantially the identical configuration to the terminal block 51 of the previous embodiment and is detachably connected to the box 31A of the controller module 30A also of substantially the identical configuration to that of the previous embodiment. That is, the mechanical connection between the controller module and the terminal module is achieved by the identical structures to those adopted in the previous embodiment. Also, the electrical connection between the controller module 30A and the terminal module 50A is achieved by the identical manners as explained in the previous embodiment. Further, the assembly of the controller module 30A and the terminal module 50A is accommodated in the same housing 10. Therefore, no duplicate explanation as to these features is deemed necessary. Like parts are designated by like reference numerals with a suffix letter of "A".

In order to assemble the controller module and the terminally module, it is equally possible to form the flange 32 on the terminal module 50 rather than on the controller module 30 and form corresponding members on the side of the controller module for receiving the flange and the associate members. Likewise, the socket and the plug may be formed respectively on the side of the controller module and the terminal module for electrical interconnection between the modules 30 and 50.

LIST OF REFERENCE NUMERALS

10 housing
11 knockout
12 stand
13 stand (stud)
14 baffle
15 latch arm
20 inner casing
30 controller module
31 box
32 flange
34 hook
36 vertical groove
38 tab
40 motor
41 time dial
42 gear train
43 set pin
44 switch
45 cam wheel
46 conductor lead (from switch)
47 conductor lead (from motor)
48 plug
49 plug
50 terminal module
51 terminal block
52 side wall
53 terminal
54 terminal screw
55 partition
56 vertical rib
57 recess
58 notch
59 hole
62 retainer arm
63 opening
66 top cover
67 leg
68 skirt
70 circuit board
71 hole
72 driver
73 component
78 socket
79 socket
80 relay switch
81 input pin
82 output pin
90 power circuit
91 control circuit
92 display-and-setting section
93 signal converter
94 switch
150 radiator fin

What is claimed is:

1. A switch integrated controller for powering an external electrical device in a controlled manner, said switch integrated controller comprising:

a controller module with a first housing;

a terminal module with a second housing, said second housing being separately formed from said first housing and detachably connected to said first housing in a direct engagement relation therewith so as to form a single complete casing, said controller module having an entry section for receiving a specific external condition and a signal generating section which generates a trigger signal when the specific condition is met by a predetermined reference, said terminal module having at least one pair of terminals for connection through wires with said external electrical device and an associated external power source, and having a relay switch which is connected between said terminals for selectively connecting and disconnecting said electrical device to and from said power source in response to said trigger signal.

2. The switch integrated controller as set forth in claim 1, wherein said terminal module includes a terminal block carrying said terminals, a circuit board mounting thereon said relay switch and electronic components forming a driver for activating said relay switch in response to said trigger signal, said relay switch having input pins for soldering electrical connection with said circuit board to receive an activating signal from said driver and output pins for direct soldering electrical connection with said terminals.

3. The switch integrated controller as set forth in claim 2, wherein said terminal block includes a horizontally extending platform for supporting thereon said circuit board, said platform being formed with an opening to allow the soldering connection between said relay switch and said circuit board as well as between said relay switch and said terminals, respectively from the bottom of said terminal module.

4. The switch integrated controller as set forth in claim 1, wherein one of said controller module and said terminal module is provided with a hook which detachably engages with a catch recess formed in the other of said controller module and said terminal module.

5. The switch integrated controller as set forth in claim 4, wherein said terminal module is physically connected to said controller module in an end-to-end relation to make a top surface of said terminal module in flush with a top surface of said control module.

6. The switch integrated controller as set forth in claim 4, wherein one of said controller module and said terminal module is formed with vertical guide slots for slidably receiving corresponding vertical ribs formed on the other of said controller module and said terminal module.

7. The switch integrated controller as set forth in claim 4, wherein one of said terminal module and said controller module is equipped with a plug which is detachable to a socket provided on the other of said terminal module and said controller for electrical interconnection between said driver on said circuit board of said terminal module with said signal generating section of said controller module.

8. The switch integrated controller as set forth in claim 3, wherein said controller module includes a set of conductor leads extending from said signal generating section for soldering connection to said circuit board of said terminal module, said platform being formed with additional openings for allowing the soldering connection between said conductor leads and said circuit board from the bottom of said terminal module.

9. The switch integrated controller as set forth in claim 1, wherein said terminal module includes a terminal block carrying said terminals each being in the form of a plate and each provided with a terminal screw extending through a front end portion of the terminal, said terminal block also carrying a circuit board mounting thereon electronic parts forming a driver for activating said relay switch in response to said trigger signal, said relay switch having output pins for electrical connection with said terminals and input pins for electrical connection with said circuit board to receive an activating signal from said driver, said relay switch being fitted over rear end portions of said terminals and said circuit board with said output pins and said input pins projecting respectively through said rear end portions of said terminals and said circuit board for soldering connection thereto respectively behind said terminals and said circuit board, said terminal being bent to make a step between the front end portion and the rear end portion which is in level with said circuit board for spatially arranging said relay switch and said electronic parts in an overlapping relation with the length of said terminal screw.

10. The switch integrated controller as set forth in claim 1, wherein said casing is accommodated in a housing having a plurality of stands which project on an inner bottom of said housing to space the bottom of said casing from the inner bottom of the housing, said terminal module including a terminal block carrying said terminals and said relay switch, said terminals being provided respectively with terminal screws for securing said wires to said terminals, and said housing being formed on its inner bottom with studs which support said terminal block at portions immediately below to said terminal screws.

11. The switch integrated controller as set forth in claim 10, wherein said housing is provided in its wall with holes for passing therethrough the wires connected to said terminals, said housing being provided on its bottom with baffles which project towards said terminal block adjacent to said terminals for preventing said wires from entering a clearance between the inner casing and the inner bottom of said housing.

12. The switch integrated controller as set forth in claim 1, wherein said controller module comprises a timer having said entry section for setting a desired time as said specific external condition and having said signal generating section which generates said trigger signal when said desired time is coincident with said predetermined reference.

13. The switch integrated controller as set forth in claim 1, wherein said controller module is arranged to make a temperature control based upon a temperature signal received at said entry section as said specific external condition from an external temperature sensor, said signal generating section generating said trigger signal when said temperature signal exceeds said predetermined reference.

* * * * *

UNITED STATES PATENT AND TRADEMARK OFFICE

CERTIFICATE OF CORRECTION

PATENT NO. : 6,262,497 B1
DATED : July 17, 2001
INVENTOR(S) : Hiroaki Muroi et al.

It is certified that error appears in the above-identified patent and that said Letters Patent is hereby corrected as shown below:

Title page,
Item [73], after "Matsushita Electric Works, Ltd., Osaka (JP)" insert -- Asahi National Lighting Co., Ltd., Osaka (JP) --.

Signed and Sealed this

Twenty-third Day of October, 2001

*Attest:*

NICHOLAS P. GODICI

*Attesting Officer*

*Acting Director of the United States Patent and Trademark Office*